US009338715B1

(12) United States Patent
Sevindik (10) Patent No.: US 9,338,715 B1
(45) Date of Patent: May 10, 2016

(54) METHOD AND SYSTEM FOR FACILITATING TRANSITION FROM BROADCAST TO UNICAST (71) Applicant: Sprint Spectrum L.P., Overland Park, KS (US)

(72) Inventor: Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 29 days.

(21) Appl. No.: 14/465,277

(22) Filed: Aug. 21, 2014

(51) Int. Cl.
  *H04W 36/18* (2009.01)
  *H04W 76/00* (2009.01)
  *H04W 76/02* (2009.01)
  *H04W 88/16* (2009.01)

(52) U.S. Cl.
  CPC ............ *H04W 36/18* (2013.01); *H04W 76/002* (2013.01); *H04W 76/021* (2013.01); *H04W 88/16* (2013.01)

(58) Field of Classification Search
  None
  See application file for complete search history.

(56) References Cited

U.S. PATENT DOCUMENTS

| | | | |
|---|---|---|---|
| 5,892,915 A | 4/1999 | Duso et al. | |
| 6,195,680 B1 | 2/2001 | Goldszmidt et al. | |
| 6,415,323 B1 | 7/2002 | McCanne et al. | |
| 6,839,865 B2 | 1/2005 | Gould et al. | |
| 6,910,078 B1 | 6/2005 | Raman et al. | |
| 7,054,949 B2 | 5/2006 | Jennings | |
| 7,076,555 B1 | 7/2006 | Orman et al. | |
| 7,159,234 B1 | 1/2007 | Murphy et al. | |
| 7,168,086 B1 | 1/2007 | Carpenter et al. | |
| 7,181,523 B2 | 2/2007 | Sim | |
| 7,318,107 B1 | 1/2008 | Menon | |
| 8,175,036 B2 | 5/2012 | Visuri et al. | |
| 2002/0116452 A1 | 8/2002 | Johnson et al. | |
| 2003/0007515 A1 | 1/2003 | Apostolopoulos et al. | |
| 2006/0173974 A1 | 8/2006 | Tang | |
| 2006/0248212 A1 | 11/2006 | Sherer et al. | |
| 2007/0168523 A1 | 7/2007 | Jiang et al. | |
| 2008/0195761 A1 | 8/2008 | Jabri et al. | |
| 2008/0209067 A1 | 8/2008 | John et al. | |
| 2009/0110132 A1* | 4/2009 | Kondrad ............. H04L 65/4076 375/354 |
| 2012/0269705 A1 | 10/2012 | Jensen et al. | |

(Continued)

FOREIGN PATENT DOCUMENTS

WO  WO2006007929  1/2006

OTHER PUBLICATIONS

U.S. Appl. No. 12/166,455, filed Jul. 2, 2008.

(Continued)

*Primary Examiner* — Khoa Huynh (57) ABSTRACT

Disclosed is a method and system to help facilitate transition from broadcast to unicast. A broadcast server provides a copy of session content to a unicast gateway, and a content-synchronizer keeps track of which UEs are broadcast recipients and what the progress of the broadcast is over time. In response to unicast attachment of a UE with the unicast gateway, as when the UE moves from broadcast coverage to unicast coverage, the unicast server determines based on information from the content synchronizer (i) that the UE is a broadcast recipient and (ii) the progress of the broadcast so far. The unicast gateway then begins transmitting to the UE the media content received from the broadcast server, starting at a point in the media content based on the determined progress. This process may thereby help to facilitate a seamless transition from broadcast to unicast, with at most a brief interruption.

19 Claims, 3 Drawing Sheets (56) References Cited

U.S. PATENT DOCUMENTS

2013/0024582 A1    1/2013   Rodrigues
2014/0372624 A1*  12/2014   Wang ..................... H04L 65/60
                                                          709/231

OTHER PUBLICATIONS

Qualcomm Research, "LTE eMBMS Technology Overview," Qualcomm, Nov. 2012.

"Intelligent Automatic Failover Technology—Automatic Switch Over (ASO)," SinoCDN Limited, Aug. 2001.

"Darwin Streaming Server failover," printed from the World Wide Web, http://lists.apple.com/archives/Streaming-server-users/2002/Aug/msg00039.html, Aug. 5, 2002.

"RTSP Redirect: msg#00142," printed from the World Wide Web, http://osdir.com/ml/video.livedotcom.devel/2006-11/msg00142.html, Feb. 19, 2008.

* cited by examiner

METHOD AND SYSTEM FOR FACILITATING TRANSITION FROM BROADCAST TO UNICAST

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In an example arrangement, the network infrastructure may include one or more packet-data network gateways (PGWs) or similar components that provide connectivity with a packet-switched network so as to support various communication services, such as general Internet communications, voice-over-IP communications, and the like.

In practice, when a UE enters into coverage of a base station, the UE may engage in a process or registering or "attaching" with the network, which may trigger setup of a bearer (logical communication tunnel) extending between the UE and a PGW, so that the PGW can then serve the UE with packet-data communications. For instance, upon detecting coverage of the base station, the UE may transmit to the base station an attach request, which the base station may then forward to a controller such as a mobility management entity (MME). After authenticating the UE, the MME may then engage in bearer-setup signaling with the base station and with a serving gateway (SGW), the base station may establish a radio link layer connection for the UE, the SGW may engage in bearer-setup signaling with a PGW, and the PGW may assign an IP address for use by the UE to engage in packet-data communications.

In essence through this process, the network may thus establish specifically for the UE what may be considered a "unicast bearer," including a radio bearer segment between the UE and the base station and an access bearer segment extending between the base station and the PGW. When the UE has data to transmit on the packet-switched network, the UE may then transmit the data on that unicast bearer to the PGW, with the data flowing from the UE to the base station on air interface resources assigned specifically to the UE, and then from the base station to the SGW and from the SGW to the PGW, for transmission from the PGW onto the packet-switched network. Likewise, when the PGW has data to transmit to the UE, the PGW may transmit the data on the unicast bearer to the UE, with the data flowing from the PGW to the SGW, from the SGW to the base station, and from the base station to the UE on air interface resources assigned specifically to the UE.

In addition to supporting unicast communication with particular UEs, the network may also support broadcast communications to UEs. To facilitate this in example arrangement, the network may include a broadcast server that receives media content from a content provider and transmits the content over a broadcast bearer established generally between the server and one or more base stations, and as each base station receives the content, the base station may broadcast the content on air interface resources reserved for the broadcast session. To set up such a broadcast, the base station may first broadcast a control channel message that informs UEs about the session, providing information such as what air interface resources will carry session content and when the session will start. Each UE that desires to receive the broadcast may then transmit a join-request to the base station, which may pass through the network to the broadcast server, and the broadcast server may then respond to each such join-request by providing the UE with information such as packet ID numbers, keys, or the like, that will enable the UE to receive and play out the session content. At a designated start time, the broadcast server may then begin transmitting the media content over the broadcast bearer to each participating base station, and the base station may broadcast the content for receipt and playout by any and all participating UEs.

Such a network may be arranged to have multiple base stations in a region concurrently provide such a broadcast, so that UEs receiving the broadcast can move between coverage of the base stations and continue to receive and play out the broadcast session content. To facilitate this, the broadcast server may transmit the media content to a multicast gateway, and the multicast gateway may multicast the content to the participating base stations, effectively defining a broadcast bearer extending from the broadcast server to the participating base stations. Further, a multicast coordinating entity may work with the base stations to help ensure that they broadcast the media content at the same time as each other, so that UEs can move between base station coverage areas and seamlessly continue to receive the broadcast content.

OVERVIEW

An issue that can arise with a network like that described above is that a UE participating in a broadcast session may move out of coverage of the base station(s) participating in the broadcast, and the UE may thus stop receiving and playing out the media content being broadcast, resulting in a poor user experience.

When a UE moves out of coverage of the base stations participating in a broadcast, the UE may move into coverage of another base station that is not participating in the broadcast, and the UE may attach with that new base station to facilitate engaging in packet-data communications. However, attachment with the new base station will not overcome the loss of the broadcast session. Consequently, an improvement is desired.

Disclosed herein is a method and system to help facilitate transition from broadcast to unicast, so that when a UE faces loss of broadcast coverage during broadcast of media content, the UE can transition to continue receiving the media content instead via a unicast bearer. In accordance with the disclosure, to facilitate this, the broadcast server may provide a copy of the session content to a PGW, and a content-synchronizer may keep track of which UEs are participating in the broadcast and what the progress of the broadcast is over time. When the PGW receives a request to establish a unicast bearer with a particular UE, which would happen when the UE moves from broadcast coverage to unicast coverage as discussed above, the PGW may then determine based on information from the content synchronizer (i) that the UE at issue is one that was a recipient of the media session broadcast and (ii) what the progress of the media session broadcast is so far.

Upon establishing a unicast bearer with the UE, the PGW may then begin transmitting the media content (as the copy received from the broadcast server) to the UE, starting at a point in the media content based on the determined progress of the media session broadcast so far, such as starting five seconds earlier. As the UE would likely be buffering the received media content, the UE may then discard any duplicate packets and continue to play out the media content. This process may thereby facilitate a seamless transition from broadcast to unicast, with at most a brief interruption in playout at the UE.

Accordingly, in one respect, disclosed is a method to help facilitate transition from broadcast to unicast. As disclosed, the method may involve receiving into a unicast gateway a request to establish a unicast bearer between the unicast gateway and a UE. Further, the method may involve, responsive to the request, (i) the unicast gateway engaging in signaling to facilitate establishment of the unicast bearer between the unicast gateway and the UE, (ii) the unicast gateway determining whether the UE is a broadcast recipient of an ongoing transmission of a media sequence from a broadcast server. In turn, the method may involve, responsive to thereby determining that the UE is a broadcast recipient of the ongoing transmission of the media sequence, (i) the unicast gateway determining a transition point in the media sequence, and (ii) the unicast gateway beginning to unicast the media sequence to the UE, via the unicast bearer, starting at a point in the media sequence based on the determined transition point, such as starting at or slightly before that transition point.

To carry out this method in practice, as noted above, the unicast gateway may receive from the broadcast server a copy of the media sequence being broadcast by the broadcast server, and the unicast gateway may implement or interwork with a content synchronizer to determine that the UE is a broadcast recipient and to determine progress of the media sequence broadcast so far. Other implementations may be possible as well.

In another respect, disclosed is a communication system that includes a content synchronizer and a unicast gateway. In an example implementation, the content synchronizer of the system is configured to monitor transmission of a media sequence over a broadcast bearer from a broadcast server to at least one base station, so as to determine (i) one or more broadcast recipients of the media sequence and (ii) transmission progress of the media sequence over the broadcast bearer. Further, the unicast gateway is configured (i) to receive from the broadcast server a copy of the media sequence being transmitted over the broadcast bearer, (ii) to detect establishment of a unicast bearer between the unicast gateway and a user equipment device (UE), (iii) to make a first determination, based on the content synchronizer monitoring, that the UE is one of the broadcast recipients of the media sequence, (iv) to make a second determination, based on the content synchronizer monitoring, that transmission of the media sequence over the broadcast-bearer has reached at least a particular point, and (v) based at least in part on the first determination and the second determination, to begin transmission of the media sequence over the unicast bearer to the UE starting at the particular point.

In addition, in another example implementation, the communication system includes a broadcast server and a unicast gateway. The broadcast server is configured to transmit a media sequence over a broadcast bearer to at least one base station for broadcast of the media sequence, in turn, by the at least one base station to multiple broadcast recipients in coverage of the at least one base station. And the unicast gateway is configured to engage in unicast communication with one or more unicast recipients, the unicast communication with each unicast recipient being over a respective unicast bearer between the unicast gateway and the unicast recipient. In the example implementation, the broadcast server is then further configured to transmit to the unicast gateway a copy of the media sequence that the broadcast gateway transmits over the broadcast bearer, and the unicast gateway is configured to receive and buffer the transmitted copy of the media sequence (e.g., to buffer a sliding window of the media sequence). Further, the unicast gateway is configured to carry out a transition process in response to establishing of a unicast bearer between the unicast server and a particular user equipment device (UE), the transition process including: (a) making a first determination that the particular UE is one of the broadcast recipients of the media sequence, (b) making a second determination that transmission of the media sequence over the broadcast bearer has reached at least a particular point in the media sequence, and (c) responsive to the first determination and the second determination, beginning to transmit the media sequence over the unicast bearer to the UE, starting at the particular point.

Also in line with the discussion above, this example implementation may also include a content synchronizer configured (i) to determine which UEs are the broadcast recipients of the media sequence, and to provide broadcast participation data indicating the determined UEs, and (ii) to track transmission progress of the media sequence over the broadcast bearer. With that arrangement, the unicast gateway would making the first determination that the particular UE is one of the broadcast recipients of the media sequence based on the broadcast participation data provided by the content synchronizer, and the unicast gateway would make the second determination that transmission of the media sequence over the broadcast bearer has reached at least the particular point in the media sequence based on the content synchronizer tracking of the transmission progress of the media sequence.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and corresponding apparatus and system will be described primarily in the context of a Long Term Evolution (LTE) network as an example. It should be understood, however, that the principles described can apply in numerous other scenarios as well, with respect to other types of networks and with many other variations. Further, the specific arrangements and processes described herein are set forth for purposes of example only, and other arrangements and elements (e.g., machines, interfaces, functions, orders of elements and functions, etc.) can be added or used instead and some elements may be omitted altogether. For instance, many of the elements described herein are functional entities that may be implemented as discrete components or in conjunction with other components, in any suitable combination and location. Further, various functions disclosed as being carried out by particular entities can be implemented by any combination of hardware, firmware, and/or software, such as by one or more processors programmed to execute computer instructions for instance, and/or outsourced to be performed by one or more other entities.

As noted above, FIG. 1 is a simplified block diagram of an example arrangement in which aspects of the present disclosure can be implemented. The arrangement of FIG. 1 includes by way of example multiple representative LTE eNodeBs (base stations), including (i) one or more eNodeBs 12 arranged to provide broadcast services and (ii) an eNodeB 14 arranged to provide just unicast service. (In practice, each illustrated eNodeB may in fact support both broadcast and unicast service, but eNodeB(s) 12 may be set to broadcast particular media content, whereas eNodeB 14 may not be set to broadcast that media content.) Further, the figure depicts a representative UE 16 that is moving from being within coverage of eNodeB(s) 12 to being within coverage of eNodeB 14. With this arrangement, as discussed above, if the UE is receiving media content being broadcast by eNodeB(s) 12 and the UE moves out of coverage of eNodeB(s) 12 and into coverage of eNodeB 14, the UE may stop receiving the media content, which may pose a user-experience issue.

Figure 1:
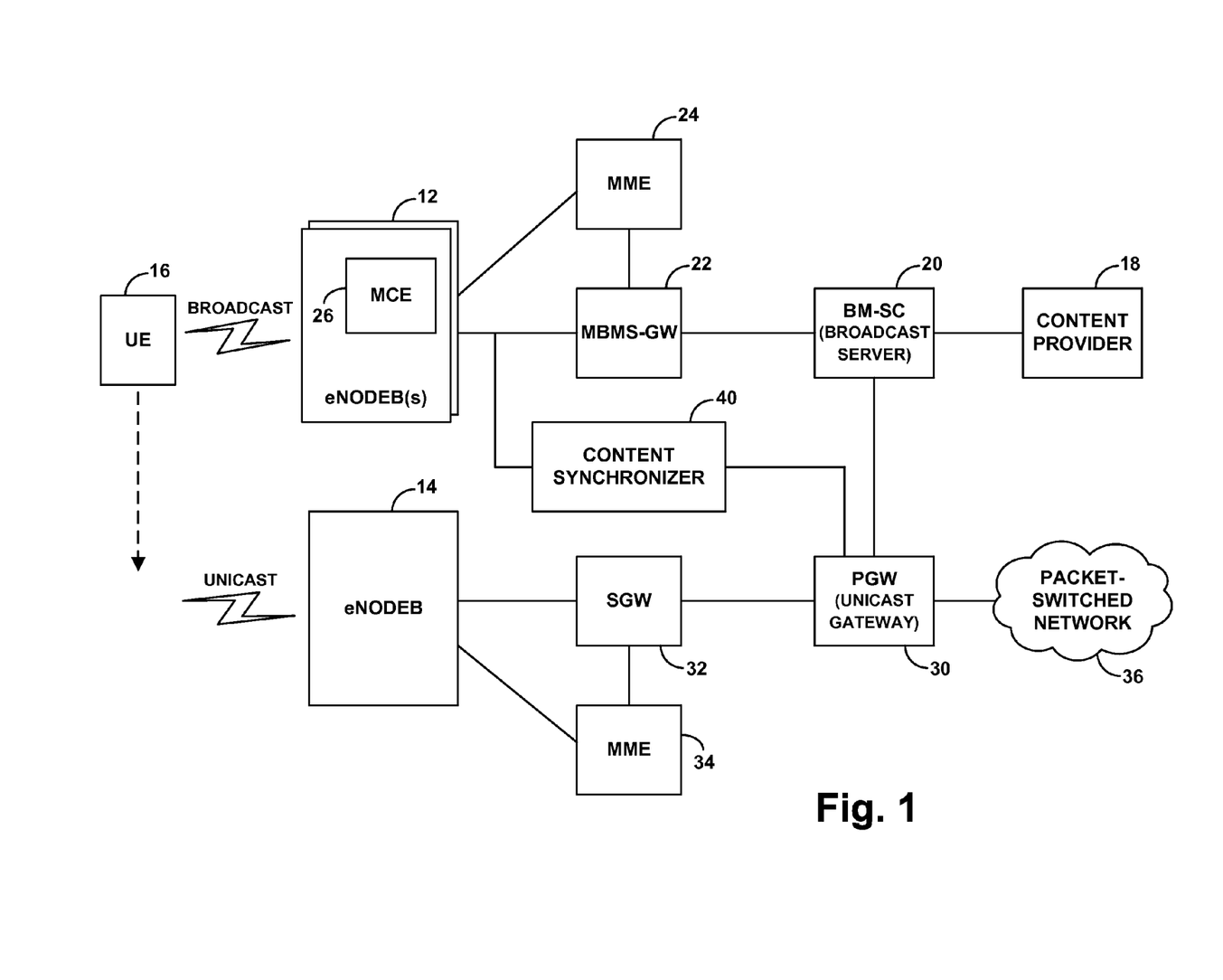
FIG. 1 is a simplified block diagram of a network arrangement in which aspects of the present disclosure can be implemented.

Referring more specifically to FIG. 1, the top portion of the figure, including eNodeB(s) 12, represents an example arrangement for broadcasting data to UEs, and the bottom portion of the figure, including eNodeB 14, represents an example arrangement for unicasting data to UEs. Other example arrangement are possible as well. Further, it should be understood that various ones of the entities illustrated in the figure could sit as nodes on one or more packet-switched networks, such as on a core packet data network operated by a service provider, and that the direct lines shown between the illustrated entities may represent logical communications paths through such a network.

In the example of FIG. 1, the broadcast arrangement includes a content provider (e.g., content provider server) 18, a broadcast multicast service center (BM-SC) 20, a multimedia broadcast multicast service gateway (MBMS GW) 22, a mobility management entity (MME) 24, and an MBMS coordinating entity (MCE) 26. With this arrangement, the BM-SC 20 (as an example broadcast server) receives media content from the content provider 20 and manages broadcast session membership and transmission of the media content for broadcast to participating UEs. The MBMS GW 22 then has an interface with the BM-SC 20 and receives media content from the BM-SC 18 and distributes the media content to participating eNodeB(s) 12 using IP multicast, for broadcast of the media content by the eNodeB(s) 12 to participating UEs. The MME 24 then has an interface with the MBMS GW 22 and functions to perform certain signaling and control functions in the network. And the MCE 26, which may be distributed among the eNodeB(s) 12 or may be centralized, functions to help coordinate and synchronize broadcast of media content by the eNodeB(s) 12.

In practice, BM-SC 20 may receive a request from content provider 18 to certain broadcast media content (e.g., a prerecorded movie or other video and/or audio recording, or a live video and/or audio feed) with a plan to start the broadcast at a particular time. In response, BM-SC 20 may then send a session request to MBMS-GW 22, which may forward the request to MME 24, and MME may in turn forward the request to MCE 26. MCE 26, MBMS GW 22, and BM-SC 20, may then engage in signaling to establish a broadcast bearer between BM-SC 20 and each participating eNodeB 12 (e.g., each eNodeB that provides coverage in a region where the broadcast is desired). The broadcast bearer between the BM-SC 20 and the participating eNodeB(s) 12 may thus comprise a tunnel between the BM-SC 20 and MBMS GW 22 and a multicast interface from the MBMS GW 22 to the participating eNodeB(s) 12. In particular, each participating eNodeB may become a member of an IP multicast group and may be set to receive user plane data transmitted from the MBMS GW 22 to that IP address. Thus, the MBMS GW 22 may then receive media content packets from the BM-SC 20 and may multicast those packets in turn to the participating eNodeB(s) 12 for broadcast.

In conjunction with this broadcast-bearer establishment process or with associated signaling, the MCE also provides each participating eNodeB 12 with a service announcement message that specifies certain bearer-context information for the broadcast session, including information such as session start time, session end time, bandwidth and/or quality of service level, and so forth. And the MCE causes each participating eNodeB 12 to reserve a portion of downlink air interface resources (e.g., certain physical resource blocks (PRBs) in certain subframes) for use as a physical multicast channel (PMCH) that will carry media content of the broadcast session. Each participating eNodeB then broadcasts the service announcement message or a corresponding message (e.g., as a multicast control channel (MCCH) message on a physical downlink control channel (PDCCH) of the eNodeB's air interface) to provide UEs in the eNodeB's coverage area with notice of the planned broadcast session.

A UE, such as UE 16, that reads the service announcement from an eNodeB 12 and desires to receive the indicated media broadcast (e.g., per user request) then engages in a process to join or opt-in to the broadcast, which triggers associated signaling to prepare the UE to receive the broadcast. In particular, the UE transmits to the eNodeB 12 a service confirmation message that carries an ID of the UE (e.g., an international mobile subscriber identity (IMSI) or radio network terminal identifier (RNTI)) and indicates the broadcast session that the UE wishes to join, and the eNodeB 12 corresponding signaling passes in turn from the eNodeB 12 to the MBMS GW 22, and from the MBMS GW 22 to the BM-SC 20. This signaling thus informs the BM-SC 20 that the UE is going to be a broadcast recipient for the session at issue. In response, the BM-SC 20 then transmits to the UE, via the MBMS GW and eNodeB (e.g., as a PDCCH message specifically to the UE), a message that informs the UE of packet IDs of the packets that will carry the broadcast media content (e.g., a range of packet-ID numbers) so that the UE can be prepared to receive, re-order if necessary, and process those packets to facilitate playout of the media content. Further, the UE may reserve cache memory and other resources to facilitate receipt, buffering, and playout of the broadcast media content.

With the broadcast bearer between the BM-SC and the participating eNodeB(s) established, the BM-SC then begins transmitting the media sequence at issue as a sequence of numbered packets via the broadcast bearer to the participating eNodeB(s) 12, according to a protocol such as MPEG-DASH for instance. In practice, the BM-SC may include in a compressed/encrypted header of each such packet (or of certain ones of the packets) the IDs of the UEs that have opted-in to be broadcast recipients of the broadcast session. Further, each eNodeB 12 transmits a control channel message (e.g., MCCH message on the PDCCH) that specifies the PMCH resources, such as particular downlink resource blocks in particular subframes, that will carry the broadcast media content, so that participating UEs can then properly receive the media content transmitted on those resources. With timing coordinated by the MCE, each eNodeB 12 then broadcasts the packets of the media sequence in the specified PMCH resources. Thus, each participating UE may receive the broadcast media sequence from one or more of eNodeB(s) 12 and may extract the media content from the packets and play out the media content.

The unicast arrangement in FIG. 1, on the other hand, is shown including a PGW 30 (as an example unicast gateway), an SGW 32, an MME 34 (which may be the same as MME 24, though shown separately), and the example eNodeB 14. With this arrangement, the PGW 30 sits as a node on a packet-switched network 36 and has an interface with the SGW 32. Further, the SGW has an interface with the MME 34, and the MME 34 has an interface with the eNodeB 14. In practice with this example arrangement, as discussed above, when a UE such as UE 16 detects sufficient coverage of eNodeB 14, the UE transmits an attach request to the eNodeB 14, which the eNodeB 14 passes along to the MME 34. The MME 34 then engages in further signaling with the eNodeB 14 and with the SGW 32, and the SGW 32 engages in signaling with the PGW 30, to set up a unicast bearer for the UE, extending from the PGW to the UE. As part of this signaling process, for instance, the UE's attach request may carry an ID of the UE, and the SGW may transmit to the PGW a create-session request that requests establishment of a bearer specifically for the UE. The PGW may then grant that request and transmit a response (e.g., a create-session response and/or a create-bearer request) specifying an IP address for the UE to use, and further signaling among the network entities may work to complete setup of the unicast bearer, including an access bearer portion extending between the PGW and the eNodeB 14 via the SGW 32, and a radio bearer portion extending over the air between the eNodeB and the UE.

With this unicast bearer established for the UE, the UE may then engage in unicast communication over the bearer as discussed above. For instance, if the PGW has data to transmit specifically to the UE (in contrast with broadcast transmissions as discussed above), the PGW may transmit that data on the UE's established unicast bearer, and so the data would flow from the PGW to the SGW to the eNodeB, and the eNodeB would assign specifically to the UE certain downlink air interface resources (PDSCH resources) that will carry the data and would transmit the data to the UE in the assigned downlink air interface resources.

As discussed above, the problem addressed by the present disclosure may occur when a UE such as UE 16 is receiving a media sequence (e.g., a numbered sequence of packets) being broadcast from eNodeB(s) 12 and the UE moves out of coverage of eNodeB(s) 12 and into coverage of eNodeB 14. To help the UE continue to receive the media sequence when this transition occurs, the present disclosure provides for an arrangement in which the PGW 30 will receive a copy of the media sequence being broadcast by the BM-SC 20 or other broadcast server (e.g., MBMS GW 22), and the PGW will learn from a content synchronizer function (i) that the UE seeking to establish a unicast connection is a broadcast recipient of the broadcast session and (ii) what the progress is of the broadcast session so far. The PGW will then advantageously begin to transmit the media sequence to the UE via the established unicast bearer, starting at a corresponding point, to enable the UE to continue receiving and playing out the media sequence, with at most a minimal interruption.

To facilitate this by way of example, the arrangement shown in FIG. 1 makes use of an interface between the BM-SC 20 and the PGW 30, to provide the PGW 30 with a copy of the media sequence being broadcast over the broadcast bearer, and the arrangement further provides a content synchronizer 40 that operates to track which UEs have opted-in to be broadcast recipients of the broadcast session and to track progress of the broadcast session. Although the content synchronizer is shown in the figure as a discrete entity separate from the PGW, it could be provided instead as a function implemented by one or more other illustrated entities, including for instance the PGW.

In practice, the BM-SC 20 may regularly transmit to the PGW 30 a copy of each packet of the media sequence a the BM-SC 20 transmits the packet over the broadcast bearer to participating eNodeB(s) 12. Alternatively, the PGW may otherwise receive such packet copies by sniffing packets flowing between the BM-SC and MBMS GW, or by sniffing packets flowing from the MBMS GW to the IP multicast address of the eNodeB(s) 12. In either case, the PGW may then buffer a sliding window of those packets, so that the PGW will have access to at least the most recently transmitted packets and be able to send them over a unicast bearer to a UE should the need arise.

Further, the content synchronizer 40 may sniff packets flowing between the MBMS GW over the broadcast bearer to the eNodeB(s) 12, such as by looking specifically for packets destined to the associated IP multicast address. The content synchronizer 40 may thus identify and read from those packets (i) the packet ID numbers, which serve to indicate progress of the media sequence broadcast so far and (ii) the list of broadcast recipient IDs, indicating which UEs have opted-in as broadcast recipients of the broadcast session. Alternatively or additionally, the content synchronizer or other such entity could learn which UEs are broadcast recipients by sniffing packets carrying service confirmation messages from those UEs to determine the UE IDs, or through signaling with the BM-SC or the like. On an ongoing basis, the content synchronizer may thus keep track of the progress of the broadcast and of which UEs are designated as recipients of the broadcast.

The PGW 30 may then periodically (or in response to other triggers) query the content synchronizer to find out which UEs are broadcast recipients. And when the PGW receives a create-session request seeking to establish a unicast bearer with a particular UE, the PGW may then refer to that broadcast recipient information to determine if the particular UE is one of those currently designated as a broadcast recipient. In a scenario as shown in FIG. 1, where UE 16 had been receiving a broadcast media sequence from eNodeB(s) 12 and transitions from coverage of eNodeB(s) 12 to coverage of eNodeB 14, the PGW would thus determine that UE 16 is a broadcast recipient.

Further, in response to determining that the UE 16 is a broadcast recipient or in response to another trigger, the PGW may also determine from the content synchronizer how far the media sequence broadcast has so far progressed, so that the PGW can use that as a basis to determine a starting point for transmitting the media sequence to the UE via the unicast bearer. By way of example, the PGW may query the content synchronizer to find out the packet-ID number of a recent (e.g., most recent) packet transmitted over the broadcast bearer, such as a latest packet transmitted over the broadcast bearer. The PGW may then treat that particular packet as a transition point in the sequence, or the PGW may treat as a transition point a point that is slightly earlier in the sequence, such as five seconds earlier or some other predefined extent earlier, to help improve the transition.

The PGW may then begin transmitting the media sequence to the UE via the unicast bearer, starting at a point based on the determined transition point, such as starting at the transition point or at a point that is a predefined offset in time or packet-count from the determined transition point. Advantageously, as the UE thus receives this unicast transmission from the PGW, the UE may continue to buffer and play out the media content. As noted above, to the extent the UE thereby receives duplicates of any packets of the sequence (e.g., receives via the unicast bearer a packet that the UE had already received in the broadcast session), the UE could discard the extra copy. And to the UE experiences a gap in the media sequence resulting from the transition from broadcast to unicast, the present process would at least have helped to minimize that gap.

Figure 2:
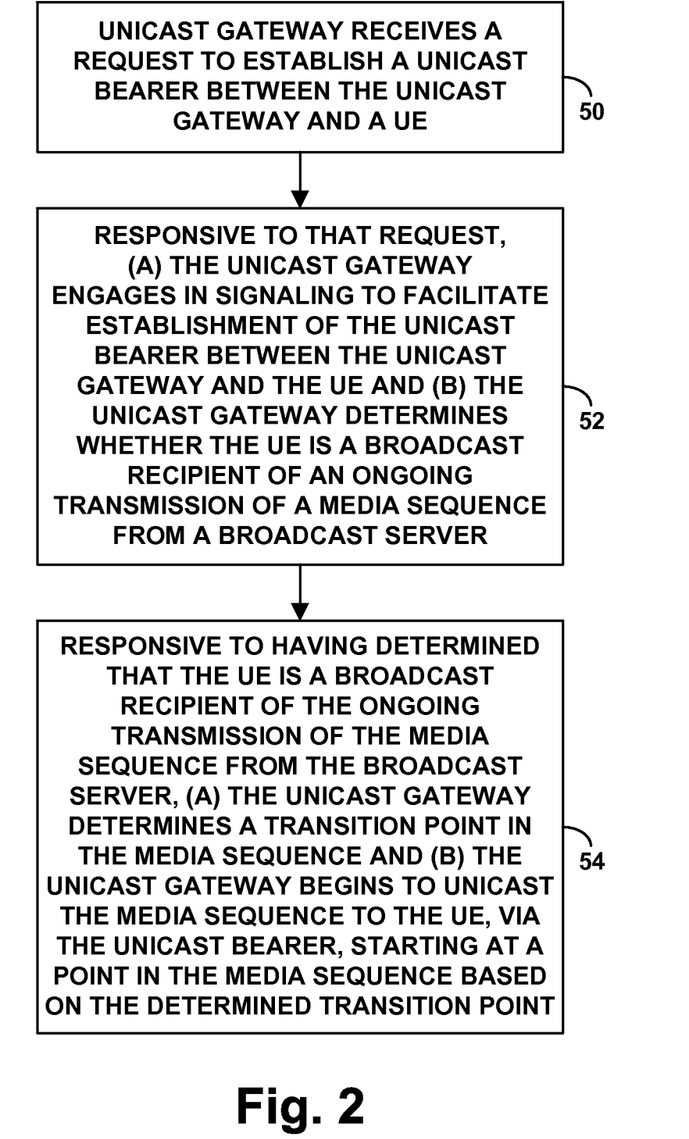
FIG. 2 is a flow chart depicting functions that can be carried out in accordance with an example method.

Turning now to FIG. 2, a flow chart is provided to illustrate functions that can be carried out in accordance with this process. As shown in FIG. 2, at block 50, a unicast gateway such as PGW 30 receives a request to establish a unicast bearer between the unicast gateway and a UE. At block 52, responsive to that request, (a) the unicast gateway engages in signaling to facilitate establishment of the unicast bearer between the unicast gateway and the UE, and (b) the unicast gateway determines whether the UE is a broadcast recipient of an ongoing transmission of a media sequence from a broadcast server. And at block 54, responsive to having determined that the UE is a broadcast recipient of the ongoing transmission of the media sequence from the broadcast server, (a) the unicast gateway determines a transition point in the media sequence, and (b) the unicast gateway begins to unicast the media sequence to the UE, via the unicast bearer, starting at a point in the media sequence based on the determined transition point.

In this process, as discussed above, the act of determining that the UE is a broadcast recipient of the ongoing transmission of the media sequence from the broadcast server can be based on UE identification data included in one or more packets of the media sequence. For instance, the unicast gateway may receive from a content synchronizer a report of which one or more UEs are each a broadcast recipient of the ongoing transmission of the media sequence, and the unicast gateway could make the determination based on that report. In particular, the media sequence could define a sequence of data packets, and one or more of the data packets could each carry an indication of the one or more UEs that are each a broadcast recipient of the ongoing transmission of the media sequence. The content synchronizer could then establish the report based on a review of the indication in at least one of the one or more data packets of the media sequence and could provide the established report to the unicast gateway.

Further, as also discussed above, the media sequence could define a sequence of numbered data packets, and the act of determining the transition point in the media sequence could involve determining, as the transition point, a sequence number of a recently transmitted data packet in the ongoing transmission of the media sequence. And again, this determination could be based on monitoring, by a content synchronizer, of the ongoing transmission. For instance, the unicast gateway could query the content synchronizer to determine the sequence number of the recently transmitted data packet.

Moreover, as also discussed above, the unicast gateway may receive from the broadcast server a copy of packets of the media sequence and may buffer those packets (e.g., on a sliding window basis) as the broadcast server transmits the media sequence for receipt by one or more broadcast recipients. And in that case, the act of beginning to unicast the media sequence to the UE starting at the point in the media sequence based on the determined transition point could involve beginning to unicast the media sequence to the UE starting with at least some of the buffered packets.

Figure 3:
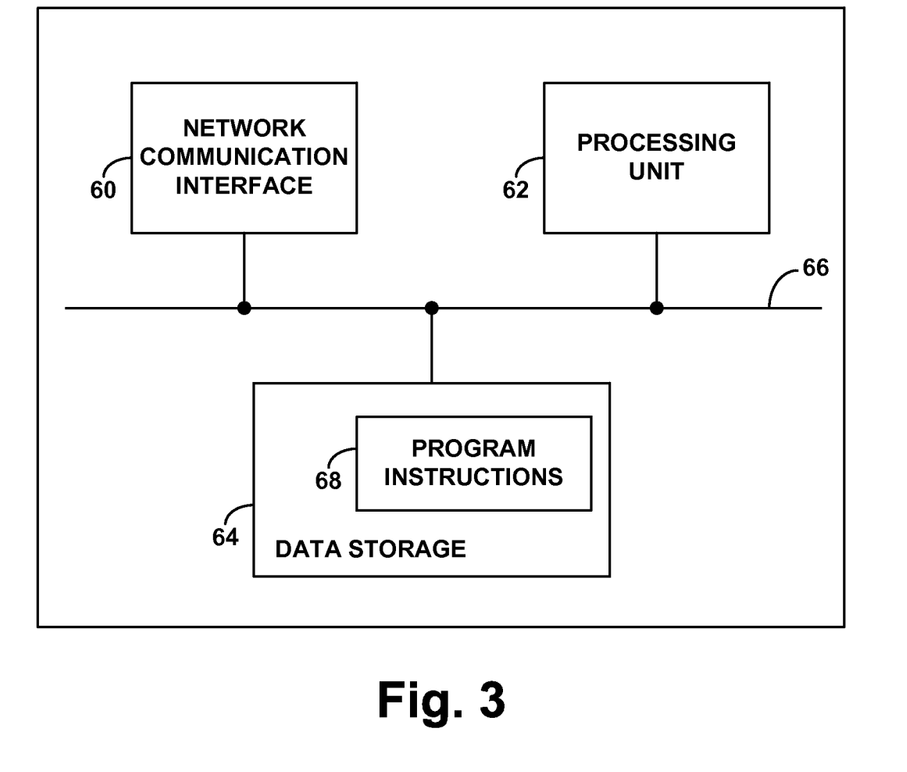
FIG. 3 is simplified block diagram of a network entity arranged to carry out various described functions.

FIG. 3 is next a simplified block diagram of an example network entity, such as a broadcast server (e.g., BM-SC), unicast gateway (e.g., PGW), or content synchronizer as shown in FIG. 1, depicting components that such an entity may include to facilitate carrying out the present method in practice. As shown, the example entity includes a network communication interface block 60, a processing unit block 62, and data storage block 64, all of which may be communicatively linked together by a system bus, network, or other connection mechanism 66.

Network communication interface block 60 may include one or more network interface modules, such as Ethernet modules, for coupling the entity with one or more networks and enabling the entity to engage in network communications with other entities. The network communication interface block of a broadcast server, for instance, may enable the broadcast server to communicate with entities such as the content provider 18, the MBMS GW 22, and PGW 30. The network communication interface block of a PGW, on the other hand, may enable the PGW to communicate with entities such as the BM-SC 20, the SGW 32, and the content synchronizer 40. And the network communication interface block of a content synchronizer may enable the content synchronizer to communicate with entities including the PGW 30 and to conduct packet analysis on packets flowing over the broadcast bearer between the MBMS GW 22 and the eNodeB(s) 12.

Processing unit 62 may then comprise one or more general purpose processors (e.g., microprocessors) and/or one or more special purpose processors (e.g., application specific integrated circuits) and may be integrated in whole or in part with the network communication interface block 60. And data storage 64 may comprise one or more volatile and/or non-volatile storage components, such as magnetic, optical, or flash storage, and may be integrated in whole or in part with processing unit 62.

As shown, data storage 64 may hold program instructions 68 executable by processing unit 62 to carry out various functions described herein. In a broadcast server, for instance, such instructions may be configured to cause the processing unit to manage broadcast session membership, to transmit a media sequence over a broadcast bearer to one or more base stations for broadcast, and to transmit to a unicast gateway of a copy of the media sequence being transmitted over the broadcast bearer.

In a unicast gateway, on the other hand, the instructions may be configured to cause the processing unit to engage in signaling to establish a unicast bearer respectively between the unicast gateway and each of one or more unicast recipients (e.g., UEs), to engage in unicast communications with each unicast recipient over the recipient's respective unicast bearer, and to receive from a broadcast serer and buffer a transmitted copy of a media sequence. Further, the instructions may be configured to cause the processing unit to carry out a transition process in response to establishing (e.g., establishment of, or currently establishing) a unicast bearer between the unicast server and a particular UE. In particular, such a transition process may involve (a) making a first determination that the particular UE is one of the broadcast recipients of the media sequence, (b) making a second determination that transmission of the media sequence over the broadcast bearer has reached at least a particular point in the media sequence, and (c) responsive to or otherwise based on the first determination and the second determination, beginning to transmit the media sequence over the unicast bearer to the UE, starting at the particular point.

In practice, for instance, the instructions of the unicast gateway could be configured to cause the processing unit to make the first determination at least in part by referring to broadcast participation data provided by the content synchronizer, to determine that the particular UE is one of the broadcast recipients of the media sequence. Further, the instructions could be configured to cause the processor to make the second determination at least in part by querying the content synchronizer to determine the transmission progress of the media sequence over the broadcast bearer.

And in a content synchronizer, the instructions may be configured to cause the processing unit to monitor transmission of a media sequence over a broadcast bearer from a broadcast server to a base station, to determine (i) broadcast recipients of the media sequence and (ii) transmission progress of the media sequence over the broadcast bearer, and to provide such information (as broadcast participation information and broadcast transmission progress information) to the unicast gateway so as to enable the unicast gateway to carry out functions as described above. For instance, the media sequence may define a sequence of numbered packets including identification data that indicates the broadcast recipients of the media sequence, and the instructions may be configured to cause the processing unit to determine which UEs are the broadcast recipients by reading the identification data from the media sequence, and to determine the transmission progress of the media sequence over the broadcast bearer by monitoring, by packet number, which packets of the media sequence have been transmitted over the broadcast bearer.

Exemplary embodiments have been described above. Those skilled in the art will understand, however, that changes and modifications may be made to these embodiments without departing from the true scope and spirit of the invention.

What is claimed is:

1. A method comprising:
  receiving into a unicast gateway a request to establish a unicast bearer between the unicast gateway and a user equipment device (UE);
  responsive to the request, (a) the unicast gateway engaging in signaling to facilitate establishment of the unicast bearer between the unicast gateway and the UE, and (b) the unicast gateway determining whether the UE is a broadcast recipient of an ongoing transmission of a media sequence from a broadcast server; and
  responsive to the determining being that the UE is a broadcast recipient of the ongoing transmission of the media sequence from the broadcast server, (a) the unicast gateway determining a transition point in the media sequence, and (b) the unicast gateway beginning to unicast the media sequence to the UE, via the unicast bearer, starting at a point in the media sequence based on the determined transition point,
  wherein the method further comprises the unicast gateway receiving from a content synchronizer a report of which one or more UEs are each a broadcast recipient of the ongoing transmission of the media sequence, wherein determining that the UE is a broadcast recipient of the ongoing transmission of the media sequence is based on the received report.

2. The method of claim 1, wherein determining that the UE is a broadcast recipient of the ongoing transmission of the media sequence from the broadcast server is based on UE identification data included in one or more packets of the media sequence.

3. The method of claim 1, wherein the media sequence defines a sequence of data packets, wherein one or more of the data packets each carry an indication of the one or more UEs that are each a broadcast recipient of the ongoing transmission of the media sequence, the method further comprising:
  establishing the report, by the content synchronizer, based on a review of the indication in at least one of the one or more data packets of the media sequence; and
  providing from the content synchronizer to the unicast gateway the established report.

4. The method of claim 1, wherein the media sequence defines a sequence of numbered data packets, and wherein determining the transition point in the media sequence comprises determining, as the transition point, a sequence number of a recently transmitted data packet in the ongoing transmission of the media sequence.

5. The method of claim 4, wherein determining the sequence number of the recently transmitted data packet in the ongoing transmission of the media sequence is based on monitoring, by a content synchronizer, of the ongoing transmission.

6. The method of claim 5, wherein determining the sequence number of the recently transmitted data packet in the ongoing transmission of the media sequence comprises querying the content synchronizer to determine the sequence number of the recently transmitted data packet.

7. The method of claim 1, further comprising, as the broadcast server transmits the media sequence for receipt by one or more broadcast recipients, the unicast gateway receiving from the broadcast server a copy of packets of the media sequence and the unicast gateway buffering the received packets,
  wherein beginning to unicast the media sequence to the UE starting at the point in the media sequence based on the determined transition point comprises beginning to unicast the media sequence to the UE starting with at least some of the buffered packets.

8. A communication system comprising:
  a content synchronizer configured to monitor transmission of a media sequence over a broadcast bearer from a broadcast server to at least one base station, to determine (i) broadcast recipients of the media sequence and (ii) transmission progress of the media sequence over the broadcast bearer; and
  a unicast gateway configured (i) to receive from the broadcast server a copy of the media sequence being transmitted over the broadcast bearer, (ii) to detect establishment of a unicast bearer between the unicast gateway and a user equipment device (UE), (iii) to make a first determination, based on the content synchronizer monitoring, that the UE is one of the broadcast recipients of the media sequence, (iv) to make a second determination, based on the content synchronizer monitoring, that transmission of the media sequence over the broadcast bearer has reached at least a particular point, and (v) based at least in part on the first determination and the second determination, to begin transmission of the media sequence over the unicast bearer to the UE starting at the particular point.

9. The communication system of claim 8, wherein the media sequence defines a sequence of packets, wherein one or more of the packets carries identification data indicating the broadcast recipients of the media sequence, and wherein the content synchronizer is configured to determine which UEs are the broadcast-recipients of the media sequence by reading the identification data from the media sequence.

10. The communication system of claim 8, wherein the media sequence defines a numbered sequence of packets, and wherein the content synchronizer is configured to determine the transmission progress of the media sequence over the broadcast bearer by monitoring, by packet number, which packets of the media sequence have been transmitted over the broadcast bearer.

11. The communication system of claim 8, wherein the broadcast server is a broadcast multicast service center (BM-SC), and wherein the unicast gateway is a packet data network gateway (PGW).

12. A communication system comprising:
   a broadcast server configured to transmit a media sequence over a broadcast bearer to at least one base station for broadcast of the media sequence, in turn, by the at least one base station to multiple broadcast recipients in coverage of the at least one base station; and
   a unicast gateway configured to engage in unicast communication with one or more unicast recipients, the unicast communication with each unicast recipient being over a respective unicast bearer between the unicast gateway and the unicast recipient, and
   wherein the broadcast server is configured to transmit to the unicast gateway a copy of the media sequence that the broadcast gateway transmits over the broadcast bearer, and the unicast gateway is configured to receive and buffer the transmitted copy of the media sequence, and
   wherein, the unicast gateway is configured to carry out a transition process in response to establishing of a unicast bearer between the unicast gateway and a particular user equipment device (UE), wherein the transition process comprises: (a) making a first determination that the 15 particular UE is one of the broadcast recipients of the media sequence, wherein making the first determination that the particular UE is one of the broadcast recipients of the media sequence comprises making the first determination based on the broadcast participation data provided by a content synchronizer, (b) making a second determination that transmission of the media sequence over the broadcast bearer has reached at least a particular point in the media sequence, and (c) responsive to the first determination and the second determination, beginning to transmit the media sequence over the unicast bearer to the UE, starting at the particular point.

13. The communication system of claim 12, wherein the content synchronizer is configured (i) to determine which UEs are the broadcast recipients of the media sequence, and to provide the broadcast participation data, wherein the broadcast participation data indicates the determined UEs, and (ii) to track transmission progress of the media sequence over the broadcast bearer,
   wherein making the second determination that transmission of the media sequence over the broadcast bearer has reached at least the particular point in the media sequence comprises making the second determination based on the content synchronizer tracking of the transmission progress of the media sequence over the broadcast bearer.

14. The communication system of claim 13, wherein the media sequence defines a sequence packets, wherein one or more of the packets carries identification data indicating the multiple broadcast recipients of the media sequence, and wherein the content synchronizer is configured to determine which UEs are the broadcast recipients of the media sequence by reading the identification data from the media sequence.

15. The communication system of claim 13, wherein the media sequence defines a numbered sequence of packets, and wherein the content synchronizer is configured to determine the transmission progress of the media sequence over the broadcast bearer by monitoring, by packet number, which packets of the media sequence have been transmitted over the broadcast bearer.

16. The communication system of claim 13, wherein making the first determination comprises referring to the broadcast-participation data to determine that the particular UE is one of the broadcast recipients of the media sequence, and wherein making the second determination comprises querying the content synchronizer to determine the transmission progress of the media sequence over the broadcast bearer.

17. The communication system of claim 16, wherein the particular point is a predefined extent earlier in the media sequence than a latest packet of the media sequence transmitted over the broadcast bearer.

18. The communication system of claim 13, wherein the content synchronizer is separate from the unicast gateway.

19. The communication system of claim 13, wherein the broadcast server is a broadcast multicast service center (BM-SC), and wherein the unicast gateway is a packet data network gateway (PGW).

* * * * *